US008848356B2

(12) United States Patent
Wotton

(10) Patent No.: US 8,848,356 B2
(45) Date of Patent: Sep. 30, 2014

(54) EXTERNALLY ACCESSIBLE MEMORY CARD READER FOR GPS DEVICE

(75) Inventor: Geoffrey Wotton, Battle Ground, WA (US)

(73) Assignee: Trail Tech, Inc., Battle Ground, WA (US)

( * ) Notice: Subject to any disclaimer, the term of this patent is extended or adjusted under 35 U.S.C. 154(b) by 277 days.

(21) Appl. No.: 13/272,011

(22) Filed: Oct. 12, 2011

(65) Prior Publication Data

US 2012/0092823 A1 Apr. 19, 2012

Related U.S. Application Data

(60) Provisional application No. 61/393,616, filed on Oct. 15, 2010.

(51) Int. Cl.
*G06F 1/16* (2006.01)
*B62J 11/00* (2006.01)
*B62J 99/00* (2009.01)

(52) U.S. Cl.
CPC .......... *B62J 11/00* (2013.01); *B62J 2099/0033* (2013.01); *B62J 99/00* (2013.01)
USPC ................. 361/679.31; 361/679.55; 361/752; 455/575.1; 455/575.8; 439/135; 439/136; 439/141; 439/145; 439/147; 439/501

(58) Field of Classification Search
CPC ... G06F 1/1656; H01R 13/5205; H05K 5/069
USPC ........... 361/679.31, 679.55, 737, 752; 455/575.1, 575.8; 439/135, 136, 141, 439/145, 147, 501
See application file for complete search history.

(56) References Cited

U.S. PATENT DOCUMENTS

| | | | | |
|---|---|---|---|---|
| 5,933,328 A | * | 8/1999 | Wallace et al. | 361/737 |
| 6,942,153 B1 | * | 9/2005 | Yuan et al. | 235/472.01 |
| 7,083,439 B1 | * | 8/2006 | Hayakawa et al. | 439/136 |
| 7,663,878 B2 | * | 2/2010 | Swan et al. | 361/679.56 |
| 7,887,344 B2 | * | 2/2011 | Ihara et al. | 439/136 |
| 8,243,458 B2 | * | 8/2012 | Chen et al. | 361/752 |
| 8,254,138 B2 | * | 8/2012 | Ouyang | 361/752 |
| 2001/0003071 A1 | * | 6/2001 | Mansutti et al. | 439/133 |
| 2006/0032653 A1 | * | 2/2006 | Minoshima et al. | 174/52.3 |
| 2007/0284229 A1 | * | 12/2007 | Chen et al. | 200/43.18 |
| 2009/0262489 A1 | * | 10/2009 | Lin et al. | 361/679.01 |
| 2009/0291709 A1 | * | 11/2009 | Lee et al. | 455/556.2 |
| 2010/0258626 A1 | * | 10/2010 | Watanabe et al. | 235/380 |
| 2012/0322516 A1 | * | 12/2012 | Kitagawa et al. | 455/575.1 |

* cited by examiner

*Primary Examiner* — Hung S Bui
*Assistant Examiner* — James Wu
(74) *Attorney, Agent, or Firm* — Hancock Hughey LLP

(57) ABSTRACT

A memory card reader assembly for a device having a GPS component includes a housing having an exterior wall and defining two interior compartments. A jack for a memory card is secured within one compartment, and the housing includes a slot for enabling insertion of a memory card through the housing wall and into the jack. That compartment, including the slot, is sealed to prevent fluid entry into the compartment.

6 Claims, 9 Drawing Sheets

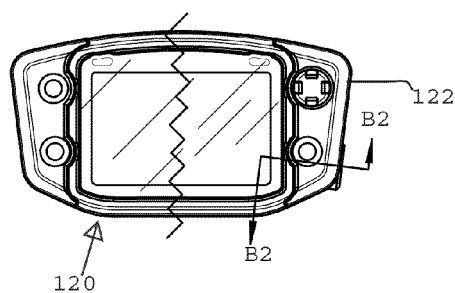
Fig. 3
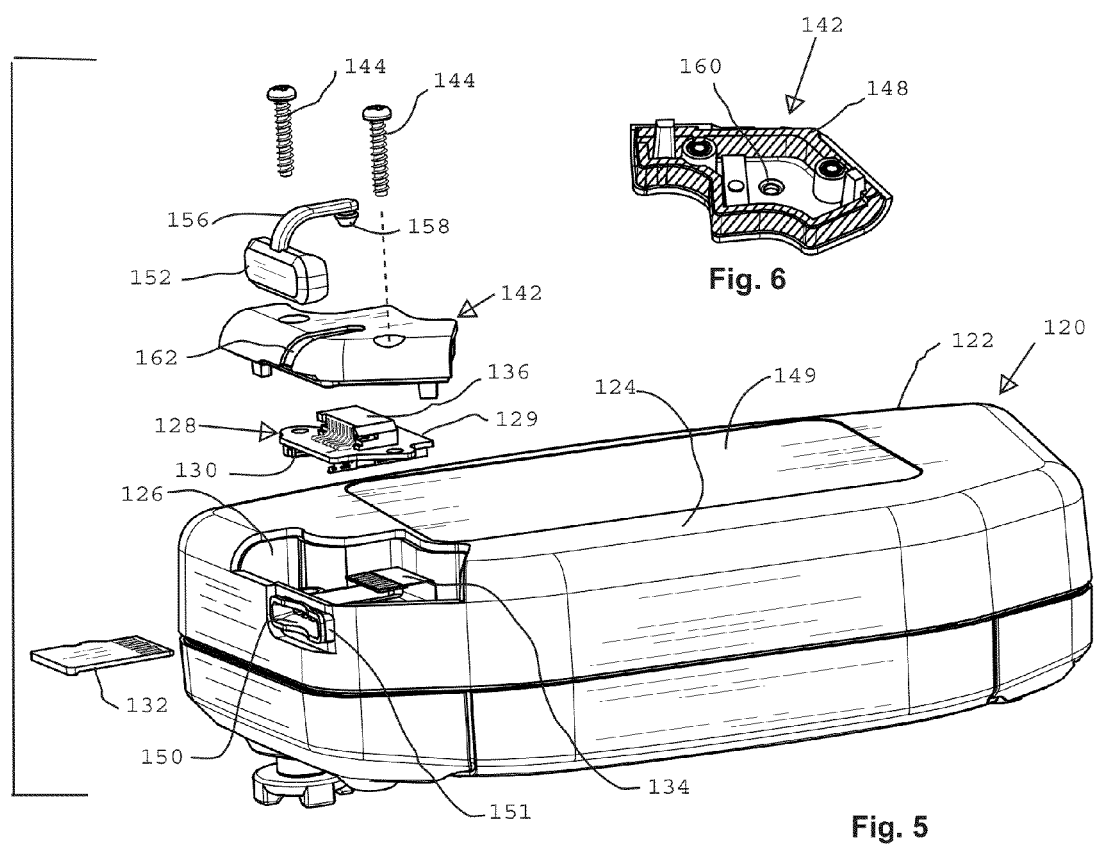
Fig. 6
Fig. 5

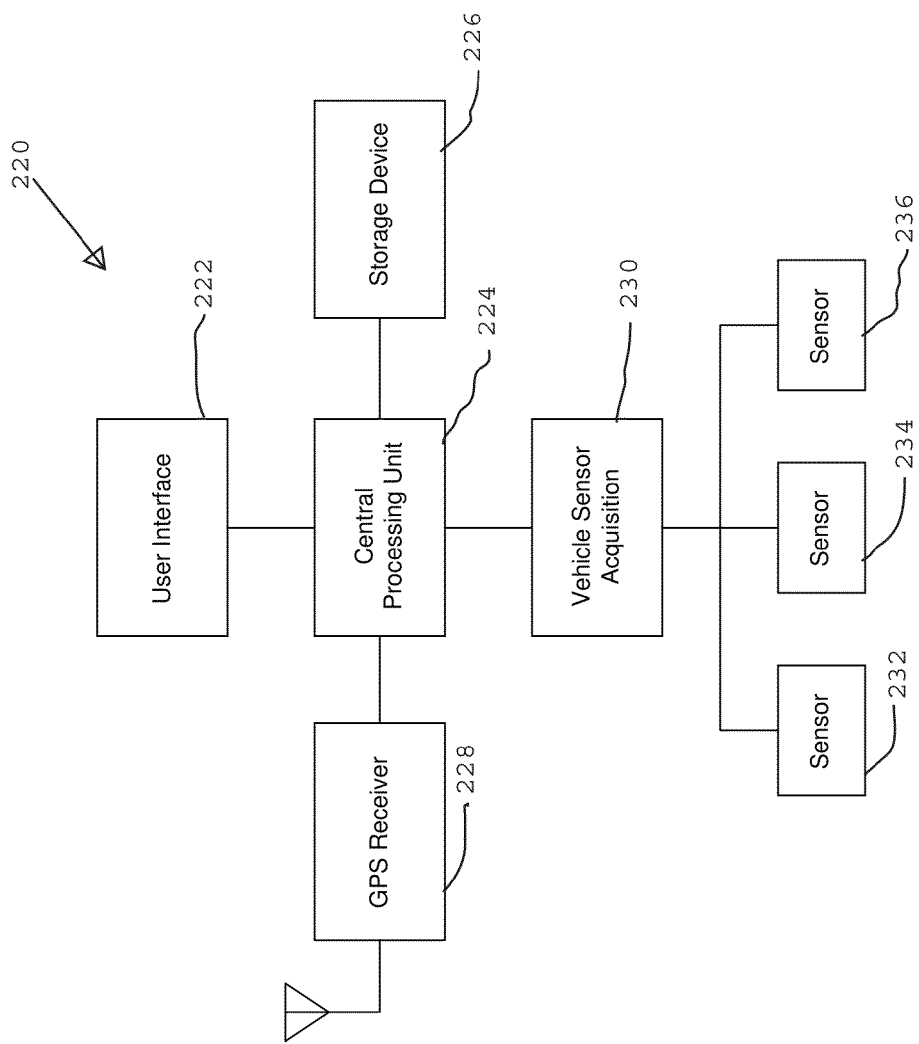

EXTERNALLY ACCESSIBLE MEMORY CARD READER FOR GPS DEVICE

BACKGROUND INFORMATION

This invention relates to a meter for motorcycles or the like. The meter incorporates many functions, including computation and display of speed, distance, direction, altitude, temperature and other engine data. The meter also incorporates a global positioning system ("GPS"), and features 3D mapping that is readily viewed, customized and shared. The meter features a robust, off-road design that is crash resistant. Aspects of the invention include:
- (a) a flexible power supply that, among other things, accepts both AC and DC power sources to simultaneously energize a vehicle computer and charge a redundant battery;
- (b) an externally accessible waterproof, fault tolerant Micro SD card reader for use with a GPS device;
- (c) a GPS data logger that uses engine data sensors to manage the recording of GPS track data; and
- (d) a mounting assembly that positions the meter for convenient viewing by the user, but in a location where the meter is most likely to remain mounted even in the event of a motorcycle crash.

While a portion of the following description relates to a meter for an off-road motorcycle, the term "vehicle" will often be used since it is contemplated that the meter and the advantages provided can be used with other motorized vehicles, including conventional street-type motorcycles, four-wheel drive vehicles, and ATVs. Similarly, the term "computer" will be interchangeably used here with the term "meter."

(a) Power Supply

There is a growing demand for embedded instrumentation systems on motorcycles and other small, gasoline-powered vehicles. Modern instrumentation systems are implemented using embedded computing systems to monitor sensors, perform data conversion and display real time information to the vehicle's operator. An example includes a simple speedometer that monitors a wheel speed sensor, converts the rotational frequency of the wheel to a speed and displays the speed to the operator.

Advanced instrumentation features, such as global positioning, require significantly higher computational effort by the embedded computing system. As a result, the power requirements of computers implementing such advanced features increase as well.

The vehicle's electrical power is generated using a coil winding, called a stator, positioned inside a magnetic field. The magnetic field is generated by a rotating series of permanent magnets attached to the engine's flywheel. This produces an alternating current (AC) power source that is used by the motorcycle to power its electrical system. Since the incandescent light bulbs used in headlights can be driven directly by AC power, many motorcycles use AC power directly for their electrical system. As a result, any computer or meter system added to such a motorcycle must be capable of utilizing an AC power supply.

In contrast, some motorcycles provide electric starters as a convenience to the vehicle's operator. Electric starters require a stored energy source in the form of a rechargeable battery to drive the starter. However, batteries are not compatible with AC power systems. Instead, the AC power produced by the stator must be converted to direct current (DC) using a regulator/rectifier. A computer installed on such a motorcycle would need to harness the DC power system in order to operate properly.

The power systems found on motorcycles and other small vehicles typically produce noisy or "dirty" voltage regulation. Vehicles with AC power systems frequently use a shunt regulator to limit the peak voltage present on the power system. Shunt regulators interact with the stators to produce brief high voltage spikes. Incandescent lamps are not affected by these voltage spikes, but semiconductor electronics (i.e. an on-board computer or meter) can be destroyed by them.

In addition, DC power systems can produce large voltage spikes when a heavy load is quickly removed from the system, such as when headlights are turned off. Also, it is possible for the battery to be installed or connected backwards in the system, thus creating a reverse bias condition on any electronic device attached. This too can destroy a computer's electronics.

A power supply can be unreliable on motorcycles and other small vehicles. It is not uncommon for an electrical system's wires to be damaged by mechanical abrasion or excessive engine heat. In addition to mechanical failure, vehicle batteries typically have small energy capacities, so they can be quickly depleted by headlights or a starter motor. Further, vehicle batteries wear out over time and can fail unexpectedly.

To overcome these reliability issues, the computer should provide a battery to serve as a redundant power source in the event of the vehicle's power system failure. The electrical current capability of the computer's power system must be able to operate the unit and charge the battery at the same time. This effectively doubles the power handling requirements of the computer's power system.

In the past, most power systems were designed to handle only DC power sources, and applying AC power to such systems will destroy them. In high-current DC applications, switched mode power supplies (SMPS) are used to efficiently convert a high input voltage to a lower output voltage. Unfortunately, the controllers that drive SMPS are sensitive to the harsh electrical environment found in motorcycles. As a result, additional protection circuits are required.

Some motorcycle computer or meter devices can utilize both AC and DC power sources. This is implemented using a two-stage power converter. First a bridge rectifier transforms the AC or DC input into an intermediate DC output voltage. Next, a voltage-limiting linear regulator regulates the intermediate DC voltage to a lower output voltage appropriate for the computer's electronics. This approach is simple, low-cost, and provides fault protection. However, the linear regulator stage is inefficient and will quickly overheat if the load current becomes excessive. Also, such systems use non-rechargeable primary batteries as a redundant power source. Therefore, battery charging does not add to the load experienced by the computer's power supply.

BRIEF DESCRIPTION OF THE DRAWINGS

FIG. 3 is a front view of a meter that incorporates an SD memory card access configuration in accord with the present invention.

FIG. 5 is an exploded, back-side-up view of the meter that incorporates the invention.

FIG. 6 is a view of the interior of a cover part of a sealable compartment that houses an SD card reader.

FIG. 7 is a diagram of a system for accurately logging GPS track data.

DETAILED DESCRIPTION: POWER SUPPLY

Figure 1:
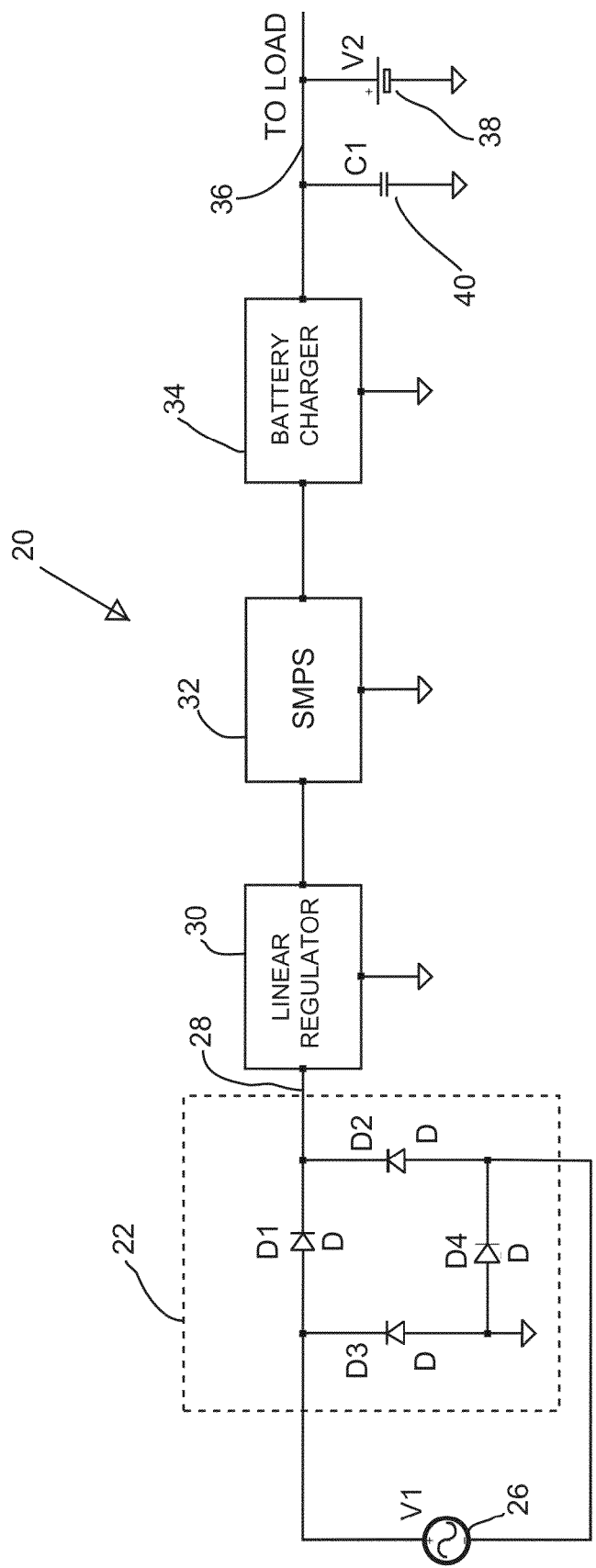
FIG. 1 is a schematic diagram of one embodiment of a power supply configured in accordance with the present invention.

One embodiment of a power supply 20 designed in accordance with the present invention is depicted schematically in FIG. 1. The power supply 20 consists of four stages. The first stage is a bridge rectifier 22 that converts any AC power input 26 into DC power at its output 28. Next, a voltage-limiting linear regulator 30 limits the magnitude of the DC voltage produced by the bridge rectifier 22. The output of the linear rectifier 30 is applied to a switched-mode power supply (SMPS) 32 that efficiently converts the input voltage to significantly lower output voltage (for example, 5.5 volts).

The output voltage of the SMPS 32 is applied to a battery charger integrated circuit (IC) 34 that manages the charging of the battery 38 and delivers on its output 36 power to the load, which in this embodiment is a computer or meter carried on the motorcycle.

A capacitor 40 is included at the output 36 of the battery charger 34. The battery-redundant capacitor 40 maintains charger output to the load even if the battery 38 is missing or malfunctioning. For example, in the event that the meter includes a GPS, the location information provided by the GPS will still be available to the operator even if the battery fails. It will be appreciated that for off-road motorcycles, preventing the loss of this location information (via the battery-redundant capacitance in the power supply) can be critically important.

Figure 2:
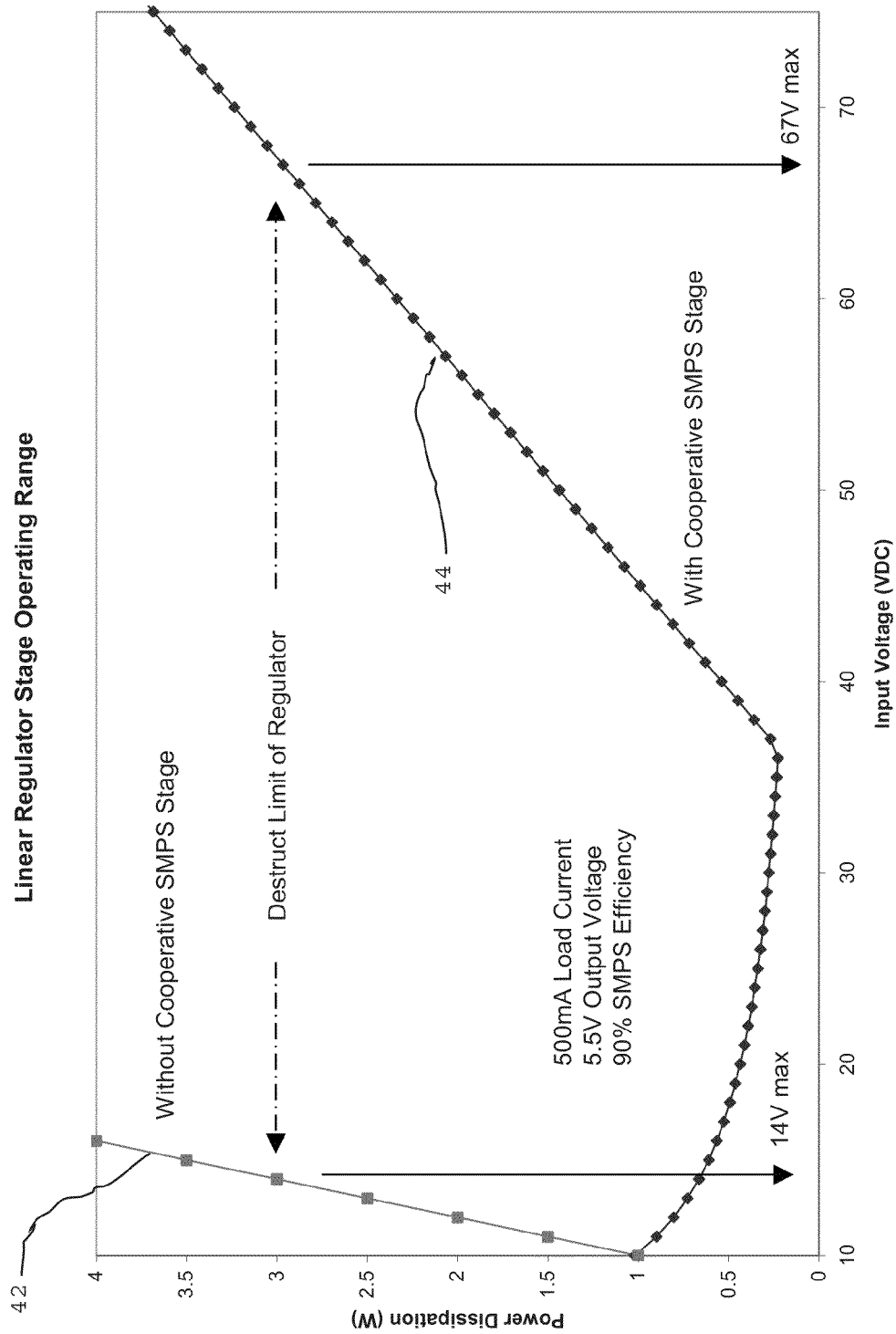
FIG. 2 is a diagram for illustrating the cooperative interaction of the linear regulator and switched mode power supply (SMPS) components of the power supply.

FIG. 2 illustrates the high-current, high-voltage capability of the power supply designed in accordance with the present invention. In short, this capability is achieved through the cooperative interaction of the linear regulator component or stage 30 and the SMPS stage 32. The SMPS stage 32 cannot survive excessive input voltages, so the linear regulator stage 30 acts as a shield preventing the high voltage from affecting the SMPS. However, the linear regulator stage 30 cannot tolerate the high load currents associated with the computer while it is drawing from a high input voltage source. As shown in FIG. A2, the exemplary plot line 42 shows how, in the absence of the SMPS stage, the linear regulator would fail at a relatively low input voltage of around 14 volts.

Fortunately, the SMPS 32 protects the linear regulator 30 by reducing the linear regulator's load current when the input voltage rises. This is illustrated in the plot line 44, which illustrates a considerably higher input-voltage limit (about 67 volts) for the linear regulator 30 when coupled with the SMPS. The result is a power system that can operate in an input-voltage environment that neither the linear regulator nor the SMPS could survive on their own.

(b) Memory Card Access

Current GPS devices that include readers for SD cards (a popular type of non-volatile memory cards) are manufactured with the SD card "buried" within the unit. Here, the term "buried" means that the connector or jack part of the reader in which the SD card is inserted is located underneath the battery or otherwise enclosed inside of the unit so that the SD card is not readily accessible from outside the unit.

This conventional arrangement keeps the SD card and the associated reader circuitry safe from water, dirt and dust, but prevents easy access by the user who may wish to quickly swap SD cards to acquire different map information, etc., during, for example, an off-road motorcycle trip. Instead, most GPS units include an input/output port (typically a USB-type) that is exposed along a side of the unit for receiving one end of a cable that is also connected to a computer for uploading and downloading data to the GPS device.

In the event that a meter device that includes a GPS component is intended to be permanently connected to a off-road motorcycle, ATV or other vehicle, using the exposed USB data port is impractical because one would need to have the GPS in the vicinity of a computer whenever data was to be transferred to or from the buried SD card. This is especially impractical for off-road motorcyclists while they are out in remote locations.

The present invention provides a meter unit that includes a GPS component, and that is intended to be permanently mounted to a motorcycle or the like, rather than being temporarily clipped or latched to a mount fixed on the motorcycle. Such temporary mounting permits the user to easily move the GPS unit between the motorcycle and a personal computer for access to data transfers via a USB port. On the other hand, permanently mounting the meter unit as contemplated here reduces the likelihood of theft of the unit, and secures the unit from being dislodged because of extreme vibration or crash impact.

While being permanently mounted to the motorcycle, the unit provides the operator with ready access to an exterior slot on the unit for insertion and removal of an SD card that is read by the unit for mapping and other purposes. The invention also addresses in a number of ways the potential problem of water or dust penetrating the slot.

In the embodiments described below, a micro SD card is discussed, but it is contemplated that SD cards of other, larger configurations could also be suitable for use with the present invention.

DETAILED DESCRIPTION: MEMORY CARD ACCESS

With reference to the figures (3-6) a motorcycle meter 120 includes a sealed housing 122 and associated controls for calculating and displaying information to the user. The housing 122 may be formed of a hard, injection-molded plastic. The back of the housing may include a group of two or more insulated-wires that extend from the housing at a location such as shown at 124 in FIG. 5. The wires, which are not illustrated, enable electrical connection between the meter and the power supply of the motorcycle to which the meter is mounted. Any passage of such wires though the housing 122 are fully sealed against water and dust.

In the back of the housing 122 at one corner, there is defined an interior compartment 126 in which is located a micro SD printed circuit assembly (SD PCA) 128. That compartment is hereafter referred to as the SD compartment 126.

As best shown in FIG. 5, the SD PCA 128 includes a circuit board 129 on one side of which is carried a jack 130. A micro SD card 132 fits into the jack 130 to mate the card and jack's electrical contacts. Information can thus be transmitted to and from the card through the conductors of a flat, flexible cable (FFC) 134 that mates with a cable connector 136 that is also carried on the circuit board 129 of the SD PCA 128.

Preferably, the SD PCA 128 comprises a complete SD card reader, and the information read from the reader is transmitted via the FFC 134 to another, remote main circuit board as described more fully below. Alternatively, the SD compartment 126 might house only an SD card jack with an FFC, such that the remaining components of the card reader circuit are carried on the remote, main circuit board.

The SD compartment 126 is normally sealed to prevent water infiltration into that compartment. Moreover, the SD compartment is configured to be separate from a second, main compartment 140 in the housing 122. As will be described, the FFC 134 passes from the SD compartment 126 to the main compartment 140, but those two compartments are otherwise sealed from one another so that no fluids will pass between them.

The interior of the SD compartment 126 is accessible to the user via a removable cover 142 that generally comprises a piece of the exterior wall of the housing 122 at the back corner, and is located over the SD compartment (FIG. 5). The cover 142 is secured in place by fasteners 144 that are threaded into bosses formed an interior partition 146 (FIG. 4) formed in the housing and that, among other things, separates the SD compartment 126 from the main compartment 140.

The cover 142 is intended to be removed only in the event that the SD PCA 128 were to fail or otherwise need replacement, as explained more below. Moreover, the cover 142 is provided with a seal so that the junction where the cover meets the remainder of the housing 122 (when the cover is fastened in place) is impenetrable by water. In one embodiment, the seal 148 is comprised of an elastomeric material applied around the periphery of the cover and/or to the edge of the housing opening to which the cover 142 is joined. Any other access to the housing interior, such as the access door 149 outlined in FIG. 5 is similarly sealed.

As noted above, an advantage of the present invention is to provide the operator with ready access to an exposed slot on the unit housing 122 for insertion or removal of a micro SD card. To this end, a through slot 150 is molded into the wall of the housing 122 to provide a path from outside of the housing into the SD compartment 126. The interior cross section of the slot 150 generally conforms to that of a micro SD card. The SD PCA jack 130 is secured in the SD compartment so that the opening of the jack is immediately adjacent to and aligned with the slot 150. A micro SD card 132 inserted through the slot will mate with the jack 130.

In a preferred embodiment, the circuit board 129 of the SD PCA is shaped with opposing flanges or protrusions that have apertures formed through them. Each aperture is concentric with a fastener 144 so that the fasteners, in addition to fastening the cover 142 to the housing 122, also secure the circuit board 129 against the plastic bosses that receive the fasteners. As a result, the SD PCA 128 is securely held in place inside the SD compartment 126 with the jack 130 aligned with the slot 150 as discussed above.

It is contemplated that an adhesive may be used in conjunction with or instead of the fasteners to secure the SD PCA 128 in place. Alternatively, the housing interior can be shaped with features that permit the SD PCA to be snap-fit into place. Preferably, the technique for securing the SD PCA within the compartment is one that will allow the user to remove and replace the SD PCA if need be, with simple tools or by hand.

Figure 4:
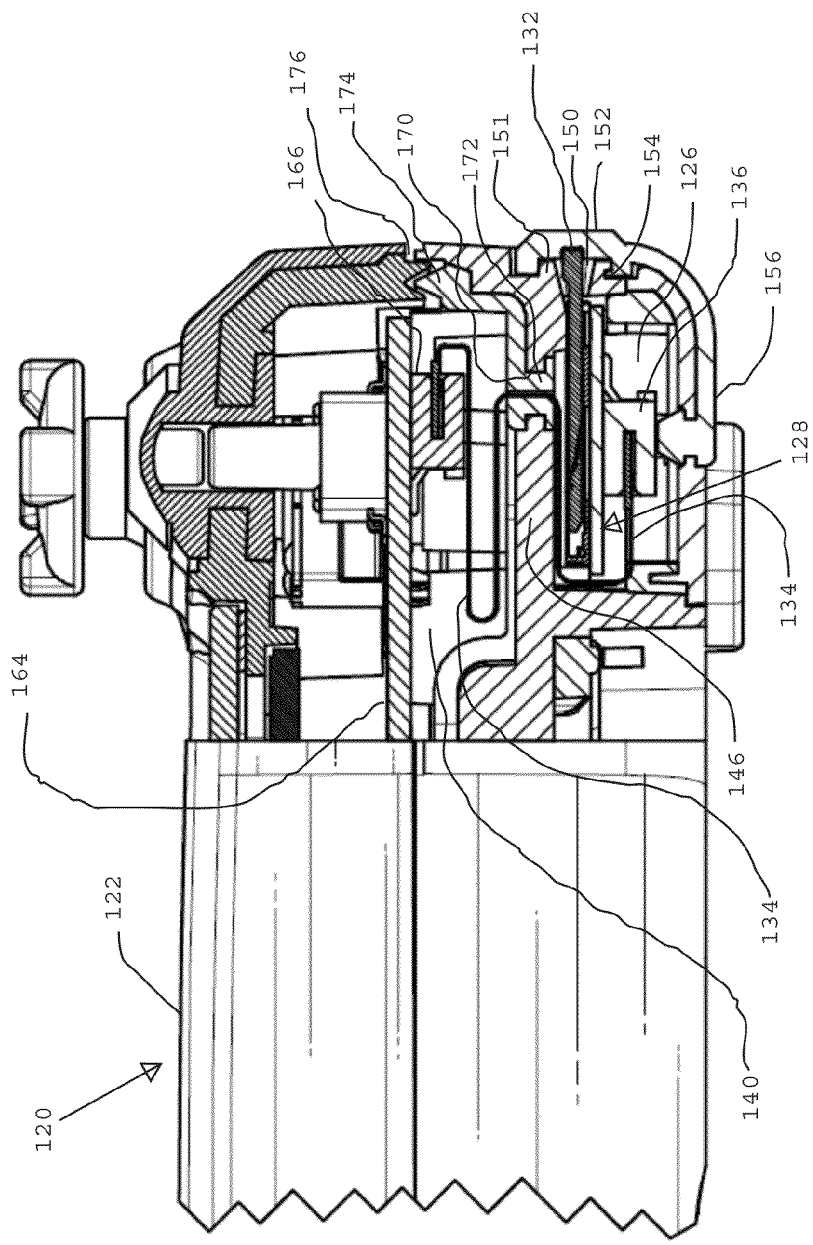
FIG. 4 is an enlarged cross sectional view taken along line B2-B2 of FIG. 3.

In order to prevent moisture or dust-laden air from entering the SD compartment 126 through the slot 150, an elastomeric cap 152 is provided. To secure the cap in place, the area of the housing exterior wall around the slot 150 is recessed so that the outermost part of the slot 150 defines a rim 151 that protrudes from the recessed portion of the wall. The cap 152 is preferably formed of silicone and is sized to completely and snugly surround the rim 151 of the slot, as best shown in FIG. 4. In addition to the snug fit of the cap 152 over the slot rim 151, the interior of the cap 152 includes one or more lips 154 that snap into correspondingly shaped grooves formed in the slot rim 151 to thus secure the cap firmly in place so that only the user's deliberate manipulation (and not, for example, vibrations during use of the motorcycle to which the unit 120 is attached) will permit the cap to be removed to expose the slot 150 for access to the SD card 132.

In a preferred embodiment, the cap 152 is anchored to the housing 122 so that it will not be misplaced or dropped when removed to permit access to an SD card. In this regard, the cap 152 has an integrally molded flexible arm 156 that terminates in a frustum-shaped wedge 158. A hole 160 is formed in the cover 142 (see FIG. 6) and into which hole 160 the wedge 158 tightly fits to anchor the cap 152 to the cover. The wedge is sized to seal the hole 160 against fluid passage through the hole into the SD compartment 126.

As shown in FIG. 5, a groove 162 is formed in the outer surface of the cover 142 between the hole 160 and slot 150. The groove 162 is sized to receive the arm 156 and thus seat the arm against the housing so that any incidental abrasive force transverse to the arm will not be transferred to the cap 152 to pull the cap from the slot, which might occur in the absence of the seating groove 162.

The foregoing portion of the description describes an effective way of providing a user with ready access to an SD card, while protecting the SD compartment 126 against unwanted penetration of water or other harmful fluids. If, for any reason, water penetrates the SD compartment 126 (as, for example, when the user neglects to replace the cap 152 during wet conditions), the present invention is designed to both protect the separate, main PCA of the meter from damage due to the moisture or dust that penetrates the SD compartment 126 and to permit a user to easily replace a damaged SD PCA if necessary. To this end, and as mentioned above, the SD compartment 126 is configured to be separate from the second, main compartment 140 in the housing, and sealed from that second, main compartment 140. On the other hand, the information carried by the micro SD card 132 is transmitted to the main circuit board inside the main compartment 140 via the above-mentioned FFC 134, which passes from the SD compartment 126 to the main compartment 140 to interconnect those two circuit boards.

With reference to FIG. 4, the main circuit board 164 is shown in cross section to include on its underside a connector 166 that receives one end of the FFC 134. The FFC 134, which appears in the figure in cross section, follows a serpentine path from the connector 166 on the main circuit board 164 to the connector 136 of the SD PCA 128.

An elongated passage 170 (shown in cross-sectional width in FIG. 4) is formed through the interior partition 146 between the SD compartment 126 and the main compartment 140. The width of the slot 170 is narrowed at its center, thereby defining a rabbeted edge of the passage where the passage 170 opens to the SD compartment 126 and to the main compartment 140.

The passage 170, including the rabbeted edges, is filled with an elastomeric plug 172, preferably formed of a TPU (Thermoplastic Polyurethane) or a TPE (Thermoplastic Elastomer). In a preferred embodiment, the plug 172 is and extended part of a peripheral seal 174 that seals a seam 176 in the housing 122. Preferably, the plug 172 and associated seal 174, as well as all other housing seals, are provided as part of the over-molding step of injection molding process. It is contemplated, however, that a plug 172 could be separately provided, and made with different (from the seals) material, such as silicone rubber.

The plug 172 is provided with a very narrow slit through which passes the FFC 134 (FIG. 4). Preferably, the slit formed by a razor-blade-like slice through the plug after the plug is formed. The slit in the plug is sized so that the relatively larger (in cross section) FFC 134 can pass through the slit, which forcibly expands the slit and thus compresses the plug material to seal it against the FFC 134 at the slit. Accordingly, the plug 172 completely seals apart the SD compartment 126 and the main compartment 140 at the passage 170 but permits electrical transmissions (via the FFC 134) between those compartments.

Accordingly, in a situation where the SD compartment 126 may be flooded with water (as may occur when the user neglects to replace the cap 152), that water is prevented from passing into the main compartment 140 and damaging the main circuit board 164. In effect, the damage is contained in the SD compartment 126, which, as noted above, is designed to enable the user to easily replace the damaged SD PCA.

(c) Accurate Track Data Logging

The demand for GPS-enabled vehicle instrumentation is growing. In particular, operators of off-road motorcycles and other small vehicle applications desire the ability to create and maintain a record of their trips using global positioning technology. That record may include, for example, geographic location coordinates captured by a data logger component of the GPS. The recorded data is commonly referred to as "track data" in that it represents "tracks" of where the vehicle has traveled. One use of such data might be to later superimpose the track onto a computer-displayed 3D map for analysis.

Many GPS data loggers provide only a manual start and stop capability. This requires the operator to remember to start recording at the beginning of a trip, to pause recording during stops, and halt recording at the end of the trip. If the vehicle operators is not diligent in remembering to start and stop the data logger, the information will be incomplete (for example, in instances where the operator's "start" commands are missing).

Also, the captured data needs to be clean and accurate so that the user does not have to waste valuable time cleaning and editing the recorded track data in order to make use of the data.

Some existing GPS data loggers utilize GPS-determined speed to control the start and stop of data recording. This provides an automatic mechanism for the data logger control. However, GPS receivers have a difficult time discriminating a stopped vehicle from noise-induced position drift. To overcome this problem, the minimum GPS speed threshold (for starting the data logger) is set at a high level, for example, 25 MPH. This high threshold is problematic for many small vehicle or off-road applications where the average speed may be less than 20 MPH.

Another approach to data logging is to continuously record track data and rely on filtering algorithms to clean up any noisy data. This approach leads to larger than necessary data files requiring additional storage memory. Since the filter algorithms work by eliminated many of the recorded data points, this approach also reduces the fidelity or accuracy of the recorded track.

The present invention provides a simple and accurate approach to GPS data logging.

DETAILED DESCRIPTION: ACCURATE TRACK DATA LOGGING

A system 220 for accurately logging GPS track data is depicted in the diagram of FIG. 7. The system may be incorporated into any GPS device. The GPS includes a user interface 222 that displays conventional GPS information and that supports manual or vocal control commands. In this embodiment, the GPS unit is mounted to a vehicle such as an off-road motorcycle.

In data logger mode, the Central Processing Unit (CPU) 224 of the device acquires location data from the GPS receiver and stores the information as track data in a suitable storage device, such as a micro SD card for later access.

In accord with the present invention, the GPS device utilizes information acquired from vehicle sensors 232, 234, 236 as a means to ascertain whether the vehicle is in motion. The sensor information, suitably collected and conditioned by the vehicle sensor acquisition module 230, is provided as input to the CPU 224. In instances where the sensor information confirms that the vehicle is not moving, the location information received via the GPS receiver 228 is ignored by the CPU (even though the location data may be changing due to noise-induced drift). Where vehicle sensor information confirms that the vehicle is indeed in motion (without regard for a minimum-speed threshold, such as 25 MPH as mentioned above), the track data will be recorded in the storage device 226.

Since data is ignored (that is, not stored) at times when the vehicle sensor output confirms the vehicle is not moving, it will be appreciated that the result of keeping only the track data associated with a moving vehicle is an elegantly simple way of filtering (actually, avoiding the collection of) noisy date, without requiring the data storage that would be necessary if a filtering algorithm were employed. This also avoids the data loss that is common with the use of such algorithms as mentioned above.

In a preferred embodiment, one sensor 232 may indicate vehicle wheel speed, while another may indicate engine RPM.

Figure 8:
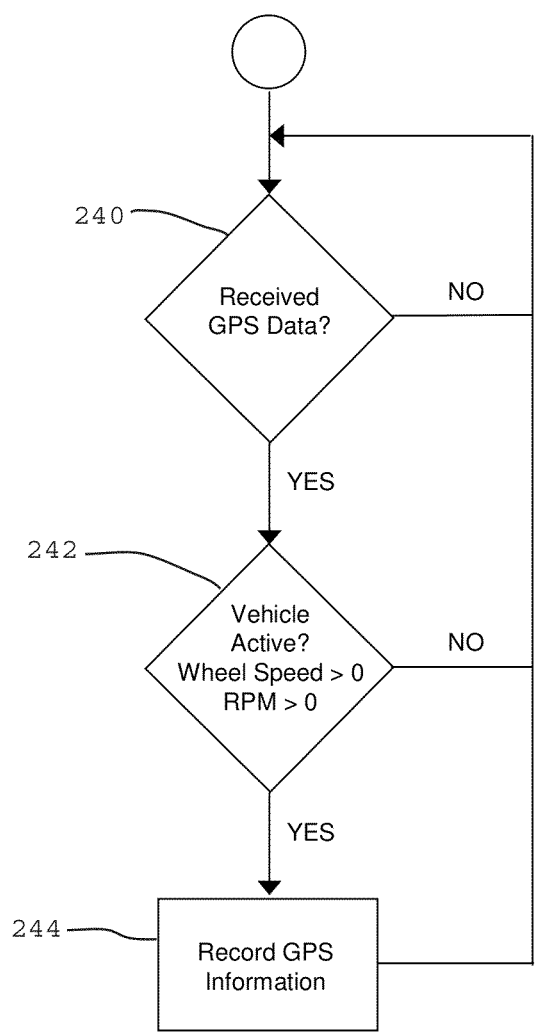
FIG. 8 is flow diagram for explaining the operation of the system.

FIG. 8 is a high-level flow diagram of the accurate track data logging employed with the present invention. In a preferred embodiment, the data logging operation commences (240) any time GPS position data is received. It is noteworthy here that the unit may be provided with a user accessible command for overriding the automatic collection of track data. For the purpose of describing this embodiment, however, the automatic data logger is treated as operable.

If GPS data is received, the CPU 224 then queries the vehicle sensor acquisition module 230 to determine whether the vehicle (ie, wheel) speed is greater than zero. Preferably, the system also checks to determine whether the engine RPM is greater than zero. If one or both of these sensors confirm that the vehicle is moving (242), the coincident GPS positional data is recorded as track data (244) in the storage device 226. In short, the storage of GPS location data as track data must be triggered by the presence of vehicle sensor information that confirms actual, coincidental movement of the vehicle. In the absence of the trigger, the data is discarded.

As mentioned above, the resultant data logged in this fashion does not require clean up or other post processing, but still provides a highly accurate reflection of the actual location traveled by the user.

(d) Handlebar Mount for a GPS Device

Figure 9:
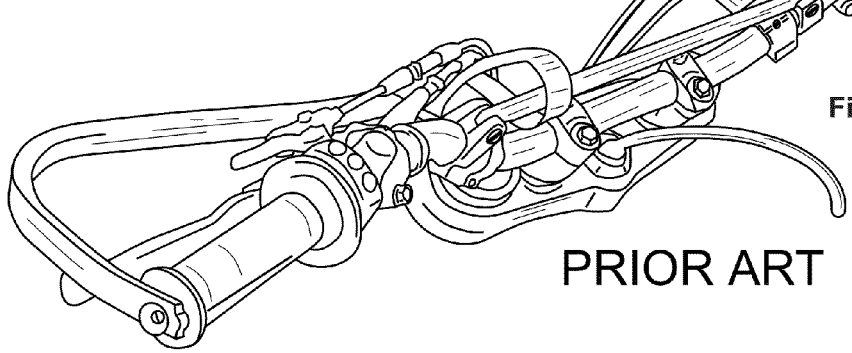
FIG. 9 is a diagram showing a prior art approach to mounting a GPS-enabled device to a motorcycle handlebar.

FIG. 9 depicts a prior art technique for mounting to a motorcycle handlebar 320 a device such as a hand-held GPS 322. While such approaches tend to support the device near the handlebar grip within easy viewing and reach of the user, the upwardly protruding nature of the mount (either near the grip or elsewhere on the handlebar) is problematic because when the motorcycle skids or crashes, the device contacts the ground and is sheared off the handlebar, damaged or lost.

The present invention provides an mount that employs a single clamp to secure a meter to a handlebar in a manner that supports the meter in cantilever fashion, adjacent to the center of the handlebar and recessed relative to the handlebar.

DETAILED DESCRIPTION: HANDLEBAR
MOUNT FOR A GPS DEVICE

Figure 10:
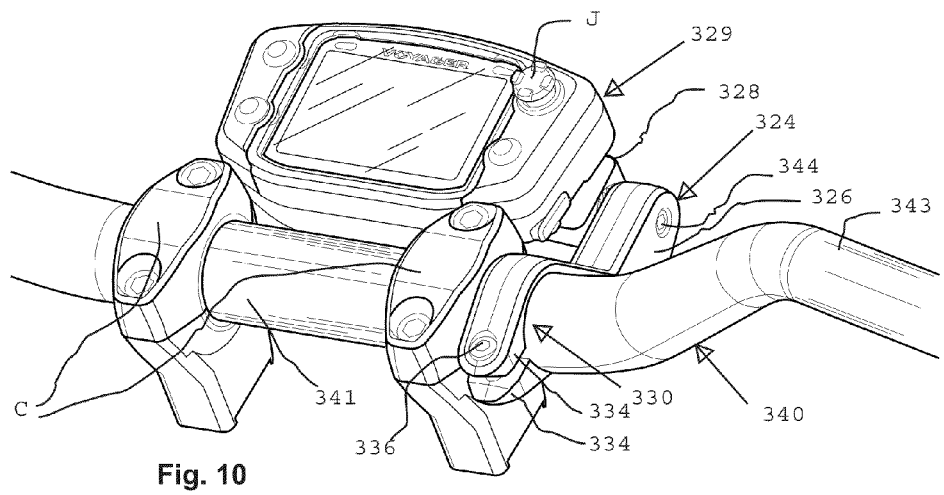
FIG. 10 is a perspective view of a handlebar mount formed in accord with the present invention and employed to support a GPS device adjacent to the central portion of the handlebar.
Figure 13:
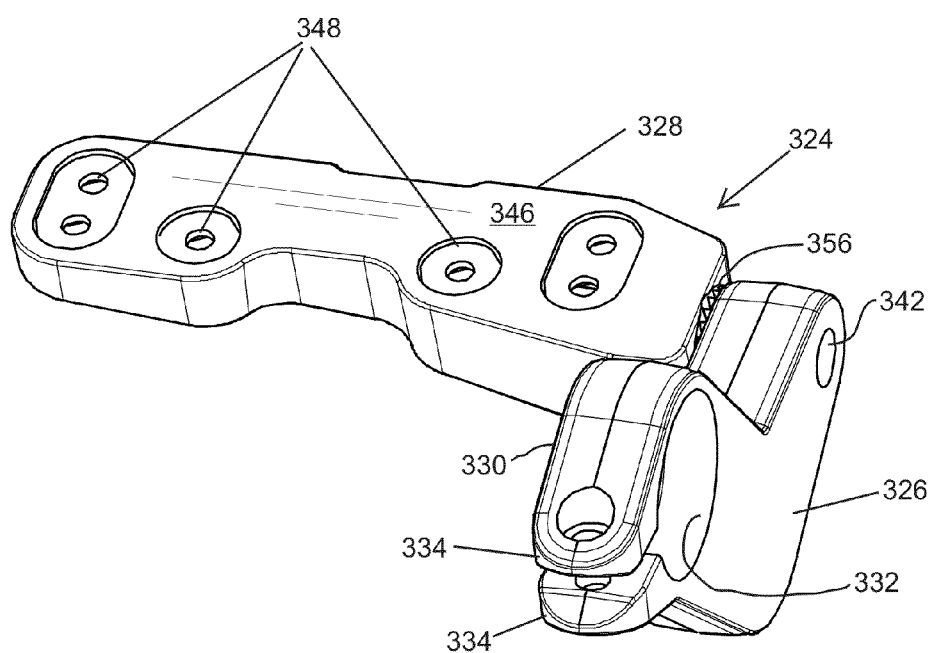
FIG. 13 is a perspective view of a handlebar mount formed in accord with the present invention, with the GPS device removed to permit illustration of the mounting surface of a platform component of the mount.

With reference to Figs. 10 and 13, the mount 324 of the present invention includes two primary components: a bracket 326 and a mounting platform 328. The mount secures a GPS device 329 forward of and adjacent to the central portion 341 of a motorcycle handlebar 340 as shown in FIG. 10.

Figure 11:
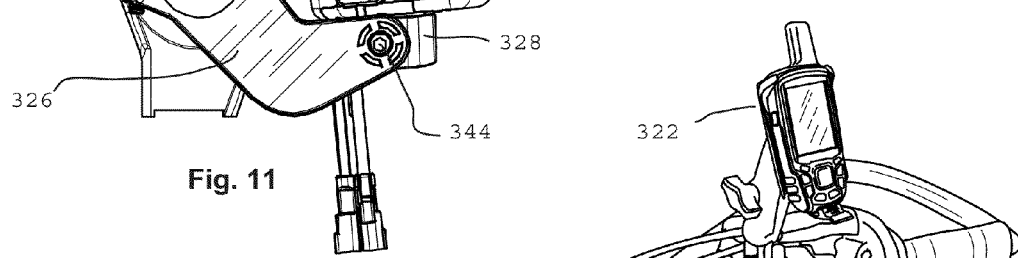
FIG. 11 is a side view of the mount and GPS device shown in FIG. 9.

The bracket 326 has integrally formed on one end a clamp 330. The clamp 330 is defined by a circular aperture 332, the diameter of which can be reduced by drawing together the two, spaced apart tabs 334 that form the outermost end of the bracket. To this end, a threaded fastener 336 and nut is employed to draw the tabs 334 together with the handlebar 340 extending through the aperture 332 (Figs 10 and 11).

Figure 14:
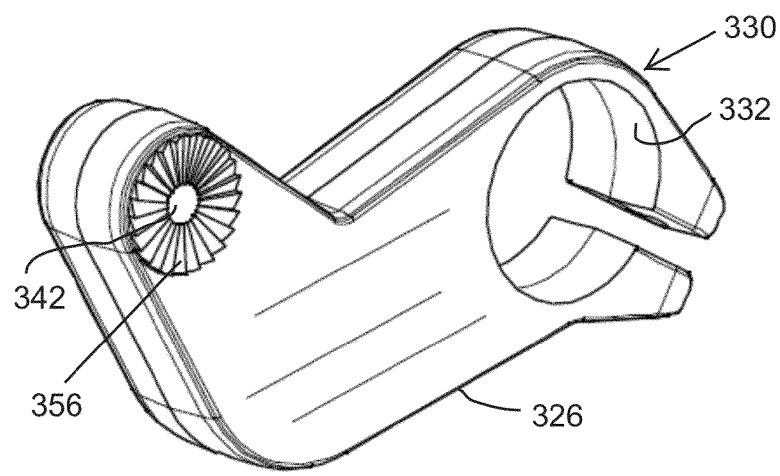
FIG. 14 is a perspective view of a bracket component of the mount.

The end of the bracket 326 opposite the clamp end includes an aperture 342 (See FIG. 14) having a central axis that is parallel to the central axis of the clamp aperture 332. A threaded fastener 344 (FIG. 10) extends through the aperture 342 to fasten together the bracket 326 and platform 328 as described more below.

Figure 15:
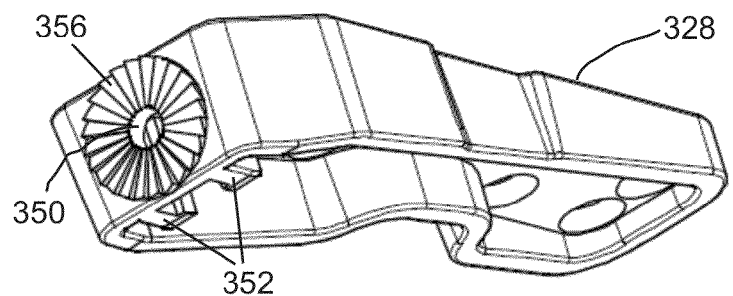
FIG. 15 is a perspective view of the platform component of the mount.

The platform 328 is an elongated member and includes a generally planar mounting surface 346 (FIG. 13). That surface includes an array of countersunk holes 348 that receive similarly arrayed female-threaded bosses present on the back of the GPS device 329 that is secured by the mount 324. Threaded fasteners (not shown) are passed from the underside of the platform 328 (appearing in FIG. 15), through the holes 348 to engage the bosses on the back of the GPS device 329 to thereby secure that device to the mounting surface 346 of the platform 328.

A proximal end of the platform 328 is formed with an aperture 350 that matches the size of the aperture 342 formed in the bracket 326. The fastener 344 mentioned above extends through both apertures 342, 350 so that the threaded shaft of the fastener engages a nut (not shown) that is trapped between a pair of features 352 that are molded in the underside of the platform. When the fastener 344 is in place and tightened, the matching, raised, circular detent surfaces 356 that are formed on both the bracket 326 and platform 328 to surround the fastener 344 mesh together (See FIG. 13). In this regard, the radially arranged, saw-tooth shaped ridges that form the detent surfaces 356 mesh to lock together the platform 328 and bracket 326 so that the bracket extends, in cantilever fashion, adjacent to and parallel with the central portion 341 of the handlebar 340.

It is noteworthy that the meshing detent surfaces 356 permit the user to rotate the platform about the axis of the fastener 344 so that the planar surface 346 of the platform can be tilted into a position that provides a user-selected, preferred viewing angle of any device carried on the platform. In order to rotate the platform 328 relative to the bracket 326, the fastener is first loosened, so that the teeth on the facing detent surfaces 356 disengage by an amount sufficient to permit the rotation. The fastener 344 is thereafter tightened to again mesh the detent surfaces 356 and lock the platform in the desired position.

Figure 12:
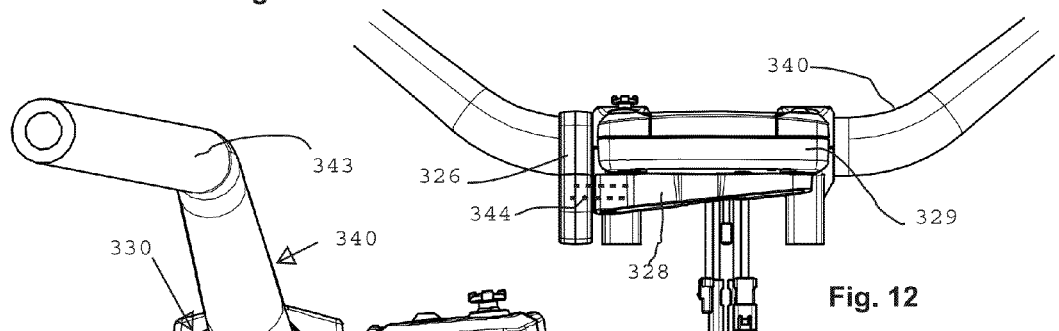
FIG. 12 is a front view of the mount and GPS device shown in FIG. 9.

With particular reference to Figs. 10, 11 and 12, the bracket 326 has a generally "L" shape so that when clamped to the handlebar, the connected platform 328 is supported below the central portion 341 of the handlebar. With most handlebars, this central portion 341 is relatively lower than the opposing, outer grip portions 343 of the handlebar. These grip portions are most likely to impact the ground if the motorcycle is crashed. On the other hand, the central portion 341 of the handlebar is somewhat recessed relative to the grip portions 343 and, as such, less likely to be impacted and damaged in a crash. Thus, locating the platform 328 to extend adjacent to and slightly below the central portion 341 of the handlebar 340 serves to protect from crashes the GPS device 329 that is mounted to the platform. Moreover, supporting the device at the center of the handlebar provides a desirable location for easy viewing of the device by the motorcycle operator.

The cantilever-type mount approach employed here allows the rotational variation of the meter that it carries (for user-selected viewing angle) to be accomplished with a simple, single rotational control component (the meshing surfaces 356). The cantilever mounting permits this rotation of the elongated platform (hence the meter) while also allowing the platform to remain quite close to the handlebar. In addition, off-road motorcycles usually have a number plate or headlight centered on but spaced forwardly of the handlebar. The compact mounting approach employed here (that is, with the elongated platform immediately adjacent to handlebar) enables that otherwise vacant space between the handlebar and light to be exploited by locating (and thus protecting) the meter there.

Also, it is not unusual for the very center portion of the handlebar (for example, in the vicinity of the bar clamps "C" depicted in FIG. 10) to be occupied with other objects, such as padding, that may prevent one from clamping a mount directly to that portion of the bar (that is, between the clamps "C"). It will be appreciated that the cantilever support of the platform and off-center clamping described and illustrated above will allow the meter to be conveniently centered relative to the handlebar, without the need to clamp directly to the center of the bar.

During normal use, a meter 329 will be subjected to vibration that is transmitted from the component (handlebar) to which it is mounted. The vibration, especially at higher frequencies, can damage and disable the internal circuitry of the device. The cantilevered clamp and platform design provided here serves to dampen or filter out the higher frequency vibrations so that they are not transmitted directly to the circuits in the meter. The damping is primarily attributable to a slight deflection of the cantilevered platform in response to vibration.

It will be appreciated that the just-noted deflection of the cantilevered platform is greater at the free end (the left end in FIG. 13) of the platform 328 away from the clamp 326. Less deflection occurs where the platform is connected to the bracket. In a preferred embodiment, the "handedness" of the mount 324 is considered with respect to the meter that it carries and with respect to the deflection variation just mentioned. Specifically, FIG. 10 depicts a "right-handed" mount that carries a meter having a joystick control "J" on the right side of the meter. This control is considered to one that is frequently accessed by a rider while the motorcycle is moving (and the mount/meter vibrating as a consequence) and it requires more dexterity than, for example, pushbutton controls on the meter. Since this joystick control is located on the mount where the least deflection occurs, it is easier to accurately manipulate by user since the joystick is moving, as a result of vibration, less than it would were it located on the left side of the meter.

The invention claimed is:

1. A memory card reader assembly for a device having a GPS component, comprising:
    a housing having an exterior wall and defining a first interior compartment and a second interior compartment;
    a jack for a memory card secured within the first compartment, the housing including a slot for enabling insertion of the memory card through the exterior wall and into the jack;
    a first sealing member movable into a sealing location for sealing the first compartment, including the slot, to prevent fluid entry into the first compartment;
    wherein the first compartment contains a memory card reader associated with the jack and an elongated, flat, flexible signal-conducting cable that extends from the jack in the first compartment and into the second compartment; and
    a compressible plug between the first and second compartments and including a slit through which passes the cable to enable signals to be conducted by the cable between those compartments, the plug being compressed against the cable thereby to prevent fluid in the first compartment from penetrating the second compartment in instances when liquid may have entered the first compartment such as when the first sealing member is out of the sealing location.

2. The assembly of claim 1 wherein the first sealing member includes a removable cap that fits snugly over the slot with the memory card inserted in the jack thereby sealing the slot.

3. The assembly of claim 2 including means for anchoring the cap to the housing.

4. The assembly of claim 1 including a removable cover for providing sufficient access to the first compartment for replacing the memory card reader, the assembly being configured so that the second compartment is sealed from the first compartment irrespective of whether the cover is removed.

5. A method of making a housing assembly for a GPS-enabled unit, comprising the steps of:
    forming a first compartment for containing a jack for a memory card reader;
    forming a slot through the housing to enable passage of the memory card from outside the unit into the jack in the first compartment;
    capping the slot with a member that can be moved to uncap the slot;
    forming a second compartment in the housing separate from the first compartment; and
    sealing the first and second compartments with a compressible plug so that fluid outside of the housing is prevented from penetrating into the first compartment and so that fluid that may enter the first compartment when the slot is uncapped is prevented from penetrating the second compartment; and
    electrically connecting together the first and second compartments with an elongated, flat, flexible cable that passes through a slit in the compressible plug such that the plug is compressed against the cable thereby retaining the sealed separation between those two compartments.

6. The method of claim 5 including the step of covering the first compartment with a sealed, removable cover for accessing the interior of the first compartment without unsealing the sealed separation between the first and the second compartments.

* * * * *